US006889961B2

(12) United States Patent
Laird et al.

(10) Patent No.: US 6,889,961 B2
(45) Date of Patent: May 10, 2005

(54) METHOD AND APPARATUS FOR FACILITATING MORE UNIFORM VAPOR DISTRIBUTION IN MASS TRANSFER AND HEAT EXCHANGE COLUMNS

(75) Inventors: Dana G. Laird, Prescott, WI (US);
Brian D. Albert, Fairfax, VA (US);
Carol A. Schnepper, Tulsa, OK (US);
Christoph Ender, Wichita, KS (US)

(73) Assignee: Koch-Glitsch, LP, Wichita, KS (US)

( * ) Notice: Subject to any disclaimer, the term of this patent is extended or adjusted under 35 U.S.C. 154(b) by 98 days.

(21) Appl. No.: 10/406,955

(22) Filed: Apr. 3, 2003

(65) Prior Publication Data
US 2003/0188851 A1 Oct. 9, 2003

Related U.S. Application Data
(60) Provisional application No. 60/369,690, filed on Apr. 3, 2002.

(51) Int. Cl.[7] .................................................. B01F 3/04
(52) U.S. Cl. ........................ 261/79.2; 261/96; 261/97
(58) Field of Search ............................ 261/79.2, 94, 96, 261/97; 202/158

(56) References Cited

U.S. PATENT DOCUMENTS

| | | | | |
|---|---|---|---|---|
| 2,233,019 A | * | 2/1941 | Linderman, Jr. ............ | 261/79.2 |
| 3,217,469 A | | 11/1965 | Eckert ....................... | 96/211 |
| 3,348,364 A | * | 10/1967 | Henby ........................ | 96/300 |
| 3,916,021 A | * | 10/1975 | Hajek et al. ................ | 261/97 |
| 4,714,542 A | | 12/1987 | Lockett, Jr. ................ | 208/347 |
| 4,808,350 A | * | 2/1989 | Robbins et al. ............. | 261/96 |
| 5,106,544 A | | 4/1992 | Lee et al. .................... | 261/79.2 |
| 5,605,654 A | | 2/1997 | Hsieh et al. ................. | 261/79.2 |
| 5,632,962 A | * | 5/1997 | Baker et al. ................. | 422/211 |

FOREIGN PATENT DOCUMENTS

| | | | | |
|---|---|---|---|---|
| DE | 241042 | * | 7/1919 | ............... 261/79.2 |
| EP | 0 440 412 A1 | | 8/1991 | |

OTHER PUBLICATIONS

De–entrainment and Washing of Flash–Zone Vapors in Heavy Oil Fractionators, by D.W. Hanson, N.P. Lieberman and E.T. Lieberman, published at www.kochglitsch.com under Press Releases & Technical Papers, dated Jul. 1999.
Improve Vapor and Mixed–Phase Feed Distribution, by Joel C. Williamson, published in World Refining, dated May, 2000.

* cited by examiner

Primary Examiner—Richard L. Chiesa
(74) Attorney, Agent, or Firm—James H. Marsh, Jr.; Stinson Morrison Hecker LLP

(57) ABSTRACT

Anti-swirl baffles are provided in a mass transfer column to reduce the swirling motion of a vapor or mixed phase feed stream introduced into the column. The column is of the type having an upper region of a preselected diameter, a lower region of reduced diameter, and an intermediate transition region that has a diameter that transitions from the preselected diameter of the upper region to the reduced diameter of the lower region. The column includes a vapor or mixed phase feed nozzle and a feed device such as a vapor horn located at least partially within the upper region for delivering the vapor or mixed phase feed stream into the column. The anti-swirl baffles are positioned in the intermediate transition region of the column to disrupt the swirling motion of the vapor or mixed phase feed stream as portions of it descend from the feed device into the transition region of the column. An annular shield positioned in the transition region and spaced inwardly of the column shell defines a liquid flow passage that is shielded from the swirling motion of the vapor or mixed phase feed stream to reduce liquid entrainment.

16 Claims, 3 Drawing Sheets

METHOD AND APPARATUS FOR FACILITATING MORE UNIFORM VAPOR DISTRIBUTION IN MASS TRANSFER AND HEAT EXCHANGE COLUMNS

CROSS-REFERENCE TO RELATED APPLICATIONS

This application claims the benefit of provisional Application Ser. No. 60/369,690, filed Apr. 3, 2002.

BACKGROUND OF THE INVENTION

This invention relates in general to mass transfer and heat exchange columns and, more particularly, to methods and apparatus to improve vapor distribution in such columns.

In mass transfer and heat exchange columns, liquid and vapor streams are brought into contact with each other, normally in countercurrent flow, for mass or heat transfer, fractionation or other operations. Various types of internals, such as trays and random and structure packing, have been developed to facilitate interaction between the liquid and vapor streams within selected contact regions of the column. In order to increase the efficiency of the mass transfer or heat exchange taking place between the vapor and liquid within these contact regions, it is important that the liquid and vapor be uniformly distributed across the horizontal cross section of the column, particularly at the lower vapor-liquid interface where the vapor enters the packing or other contacting device.

In columns of the types described above, vapor or mixed-phase feed streams are frequently introduced radially or tangentially into the column through a feed nozzle at a location below the contact region. The vapor phase of the feed stream then rises through the contact region and interacts with downwardly flowing liquid. Various devices have been developed in an attempt to interrupt the radial or tangential momentum of the vapor feed and redirect it so that it is able to rise in a more uniformly distributed manner across the cross section of the column as well as to separate the liquid components present in the feed stream from the vapor phase. In U.S. Pat. No. 5,106,544 to Lee et al., internal vanes are positioned within an annular vapor horn and are oriented to redirect the vapor or mixed phase feed stream downwardly through the open bottom of the vapor horn. The downwardly deflected vapor is then said to rise in a more uniform manner into an overlying packing bed. In U.S. Pat. No. 5,605,654 to Hsieh et al., several different embodiments of vapor horns are disclosed, including those in which deflectors or anti-swirl baffles are positioned radially inwardly of the inner annular wall of the vapor horn. The purpose of the anti-swirl baffles is to disrupt the cyclonic or swirling vapor flow along the inward face of the inner annular vapor horn wall.

In many types of towers and columns, including but not limited to virgin crude vacuum columns, virgin crude columns, FCCU main fractionator slurry pumparounds, visbreaker vacuum flashers, heavy oil vacuum towers, heavy oil fractionators, coker main fractionators, visbreaker fractionator, flexicoker main fractionators, and recovered lube oil vacuum towers, the vapor or mixed phase feed stream is fed at high velocity through the feed nozzle into a flash zone located just above a section where the column transitions to a reduced diameter. The feed nozzle typically includes a vapor horn or vane inlet device that facilitates a coarse separation of vapor and liquid and is designed to create a uniform distribution of vapor entering the overlying internals. The internals can include trays, random packing, structured packing, grid packing, open spray chambers or side-to-side shower decks. Some of the vapor feed entering the flash zone travels downwardly into the region of reduced column diameter before reversing direction and moving up through the flash zone and into the overlying internals. The motion imparted to the high velocity vapor stream by the vapor horn or other feed device interacts with the transition to the reduced column diameter to create an intense swirling or cyclonic motion in the column section below the feed nozzle. This swirling motion is only partially abated using the anti-swirl baffles on the inner wall of the vapor horn described above, and can cause liquid on the inner wall of the column and any underlying internals to become entrained in the vapor. The swirling motion also inhibits the ability to uniformly distribute the vapor into the internals overlying the flash zone.

A need has thus developed for a method and apparatus to further reduce or eliminate the swirling vapor motion in the columns described above.

SUMMARY OF THE INVENTION

In one aspect, the invention is directed to a column having a feed nozzle through which vapor or a mixed phase is fed at a high velocity into a feed zone within the column. A feed device such as a vapor horn or vane inlet device is positioned within the column adjacent the feed nozzle to interrupt and redirect the momentum of the feed stream so that the vapor phase is able to rise in a more uniform manner into an overlying contact zone containing internals such as trays, random packing, structured packing, grid packing, open spray chambers or side-to-side shower decks. The feed device is constructed to redirect at least a portion of the feed stream downwardly into an underlying section of the column that tapers or transitions to a reduced diameter. Anti-swirl baffles are positioned within this transition region of the column to disrupt the swirling motion of the downwardly deflected feed stream. In addition, the anti-swirl baffles reduce the vapor maldistribution that can result as the swirling vapor rises upwardly through the feed zone into the overlying internals.

In another aspect, the present invention includes a shield, which is spaced from the column shell in the transition region to shelter liquid flowing down the shell from the swirling vapor that could cause re-entrainment of the liquid. The shield can take the form of a concentric annular wall that is spaced inwardly from the column shell to create an annulus in which the descending liquid is shielded from the swirling vapors. The annular wall is preferably, but not necessarily, a configuration, such as frusta-conical, that is complementary to the shape of the transition region. The anti-swirl baffles are preferably mounted to a radially inward face of the annular wall.

In a further aspect, the invention is directed to a method of distributing a vapor or mixed phase feed stream within a column having a vapor or mixed phase feed stream feed zone located above a section of the column that transitions to a reduced diameter. The method includes the steps of directing at least a portion of the vapor or mixed phase feed stream downwardly into the transition region and deflecting the momentum of the vapor or mixed phase feed stream in the transition region using deflectors positioned therein. In this manner, the deflectors disrupt any swirling motion imparted to the downwardly directed feed stream to thereby reduce liquid entrainment and provide a more uniform distribution of the vapor stream as it rises through the feed zone. The method also includes the step of shielding liquid descending along the inner surface of the column shell from the swirling vapor in the transition region. The shielding is preferably accomplished by providing a concentric annular wall inwardly of the column shell in the transition region and allowing the liquid to descend through the resulting annulus while shielded from the swirling vapor.

BRIEF DESCRIPTION OF THE DRAWINGS

In the accompanying drawings which form part of the specification and are to be read in conjunction therewith and in which like reference numerals are used to indicate like parts in the various views.

DESCRIPTION OF THE PREFERRED EMBODIMENTS

Figure 1:
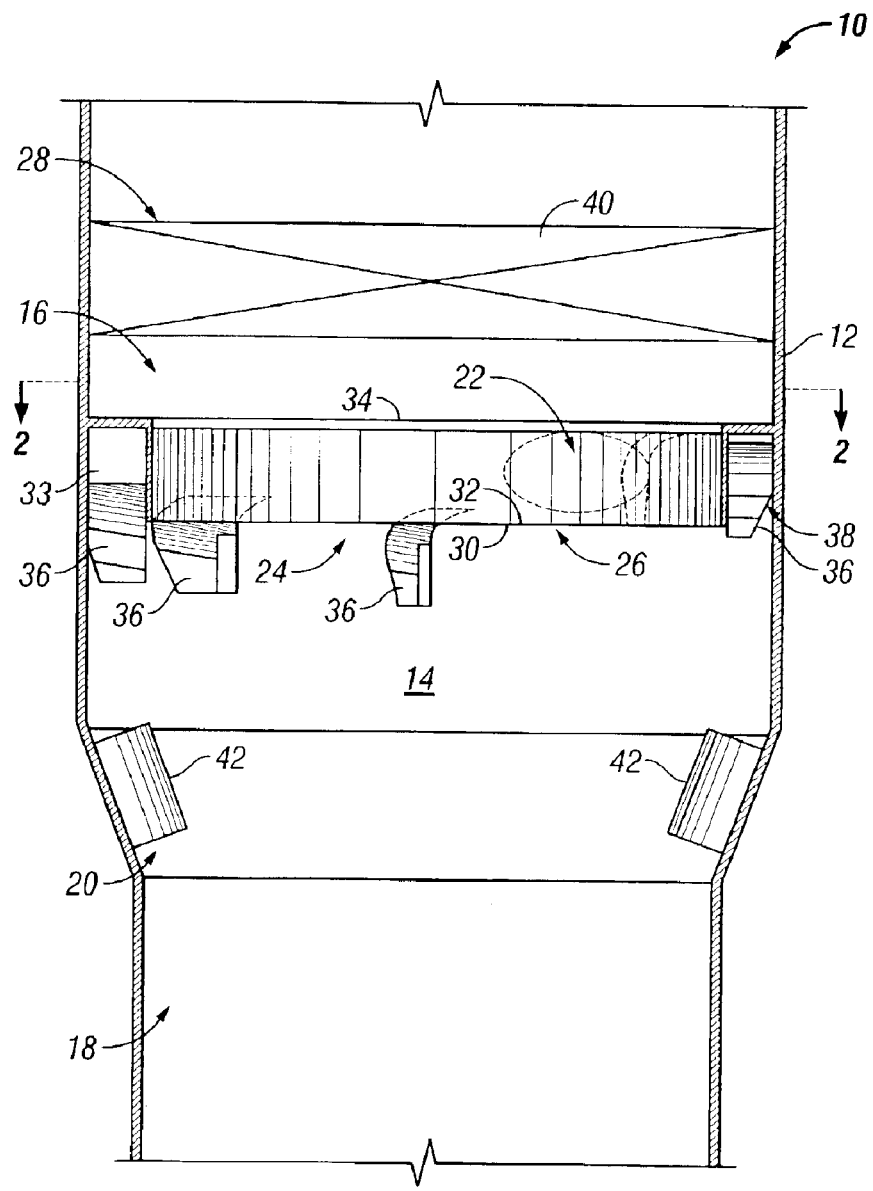
FIG. 1 is a fragmentary side elevation view of a portion of a mass transfer or exchange column which transitions from an upper region of a preselected diameter to a lower region having a reduced diameter, and illustrating baffles placed along the column transition zone in accordance with the present invention to reduce or eliminate vapor swirling within the transition zone.
Figure 2:
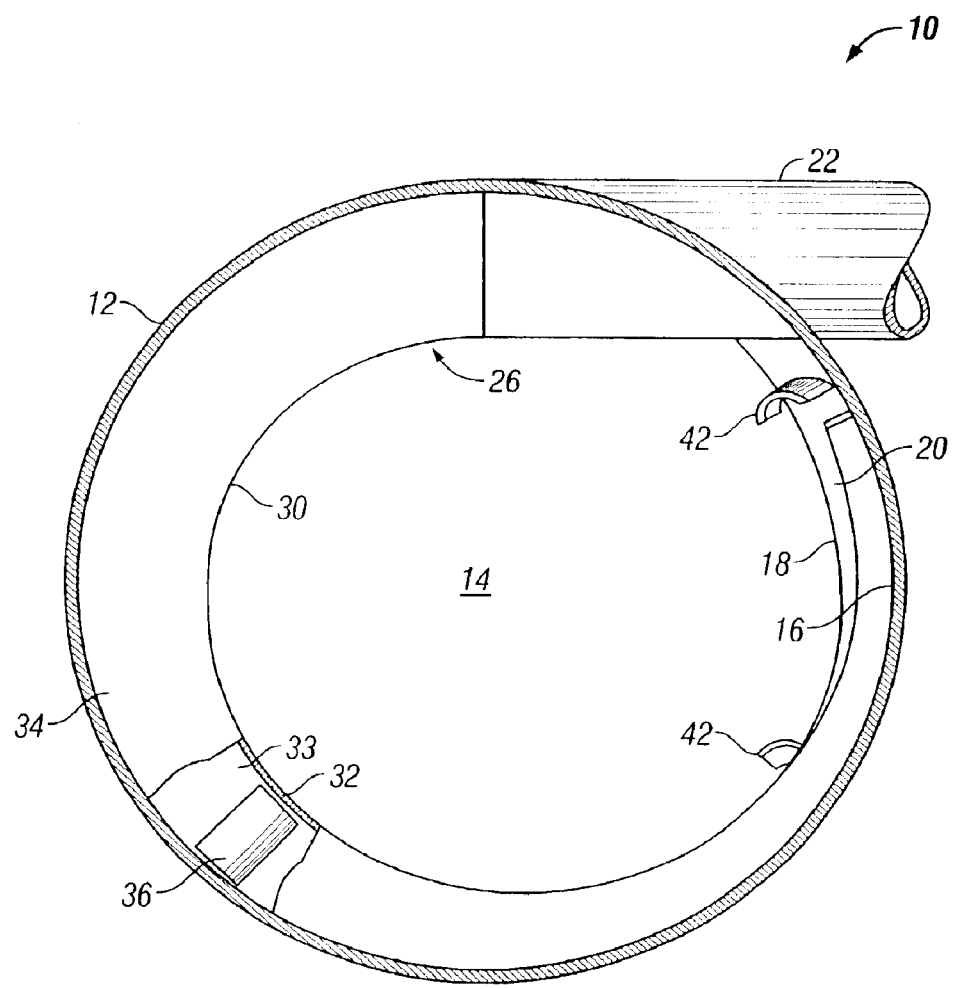
FIG. 2 is a fragmentary top plan view of the column taken in horizontal section along line 2—2 of FIG. 1 in the direction of the arrows.

Referring now to the drawings in greater detail, and initially to FIGS. 1 and 2, a mass transfer or heat exchange column is designated generally by the numeral 10. Column 10 comprises an external shell 12 which defines an open internal region 14 and which has an upper region 16 of a preselected diameter, a lower region 18 of lesser diameter, and a transition region 20 positioned between the upper region 16 and lower region 18. The transition region 20 tapers from the diameter of the upper region 16 at the top to the diameter of the lower region 18 at the bottom. The primary function of the transition region 20 is to provide a transition between the larger diameter of the upper region 16 and the reduced diameter of the lower region 18. To achieve this function, the transition region 20 may have a conical shape as illustrated in the FIG. 1, or it may have curved or multi-segmented sides to form other shapes such as hemispherical or elliptical.

The column 10 includes at least one vapor or mixed phase feed nozzle 22 which is located within the upper region 16, but may also partially extend into the transition region 20. The feed nozzle 22 delivers a high velocity vapor or mixed phase feed stream tangentially into a feed zone 24 located within the upper region 16 of the column 10. Alternatively, the nozzle 22 may be oriented to deliver the vapor or mixed phase feed stream radially or at some intermediate orientation into the feed zone 24. More than one nozzle 22 may also be used if desired for particular applications. A feed device 26 is positioned at the outlet of the feed nozzle 22 to interrupt and redirect the momentum of the high speed feed stream so that the vapor phase is able to rise in a more uniform manner into an overlying contact zone 28. The feed device 26 preferably comprises a vapor horn 30 having an inner annular wall 32 spaced inwardly from the column shell 12 to form a flow passage 33 around at least a major portion of the periphery of the shell 12. The inner annular wall 32 is preferably placed gradually closer to the shell 12 in the direction of flow of the feed stream so that the radial width of the flow passage 33 gradually decreases in the direction of feed stream flow. The vapor horn 30 includes a top 34 which extends horizontally between inner annular wall 32 and the column shell 12 to block upward passage of the feed stream traveling within the vapor horn 30. A plurality of guide vanes 36 extend upwardly through an open bottom 38 of the vapor horn 30 into the feed stream flow passage 33. The guide vanes 36 are constructed to redirect the vapor or mixed phase feed stream in a downward direction and are positioned at gradually increasing heights in the direction of feed stream flow within the vapor horn 30.

Numerous modifications can be made to the vapor horn 30, such as those described in U.S. Pat. No. 5,605,654, which is incorporated herein by reference in its entirety. Alternatively, other types of feed devices 26 known in the prior art can be used. For purposes of the present invention, it is important only that some or all of the vapor or mixed phase feed stream that encounters the feed device 26 is directed in a downwardly direction into the underlying transition region 20.

Various internals 40, such as trays, random packing, structured packing, grid packing, open spray chambers and/or side-to-side shower decks, are located in the contact zone 28. For example, when the column 10 is a crude vacuum column, the internals 40 will comprise part of a wash zone which is designed to remove entrained residual components from a flash zone vapor stream. The wash zone internals 40 will typically comprise contacting devices, such as trays or packings, and spray nozzles or headers which deliver wash oil to the contacting devices. Other combinations and arrangements of internals 40 are possible and are within the scope of the invention.

The transition region 20 includes at least one and preferably a plurality of baffles 42 which are constructed and positioned to prevent or reduce the swirling motion that can be imparted to the high velocity vapor or mixed phase feed stream as it is deflected downwardly into the transition region 20 by the feed device 26. The baffles 42 may abut the column shell 12 or they may be spaced therefrom to allow a portion of the feed stream to pass between the baffle 42 and shell 12. The baffles 42 may be planar or curved and may extend along only a portion or the entire longitudinal length of the transition region 20. The baffles 42 may each be of the same construction, or baffles 42 in one portion of the transition region 20 may be constructed or oriented differently than baffles in other portions of the transition region 20. The objective of the baffles 42 is to prevent or disrupt some or all of the swirling motion of the feed stream in the transition region 20 to achieve a uniform vapor stream flow pattern with only vertical velocity components. In addition, the baffles 42 reduce the vapor maldistribution that can result as the swirling vapor rises upwardly through the feed zone 24 into the overlying internals 40. It will be appreciated that many modifications can be made to the baffles 42 to achieve these objectives while remaining within the scope of the present invention. In addition, the invention is generally directed to various types of columns 10 that employ a transition region 20 and a high velocity vapor or mixed phase feed feed, such as virgin crude columns, FCCU main fractionator slurry pumparounds, visbreaker vacuum flashers, heavy oil vacuum towers, heavy oil fractionators, coker main fractionators, visbreaker fractionator, flexicoker main fractionators, and recovered lube oil vacuum towers.

Figure 3:
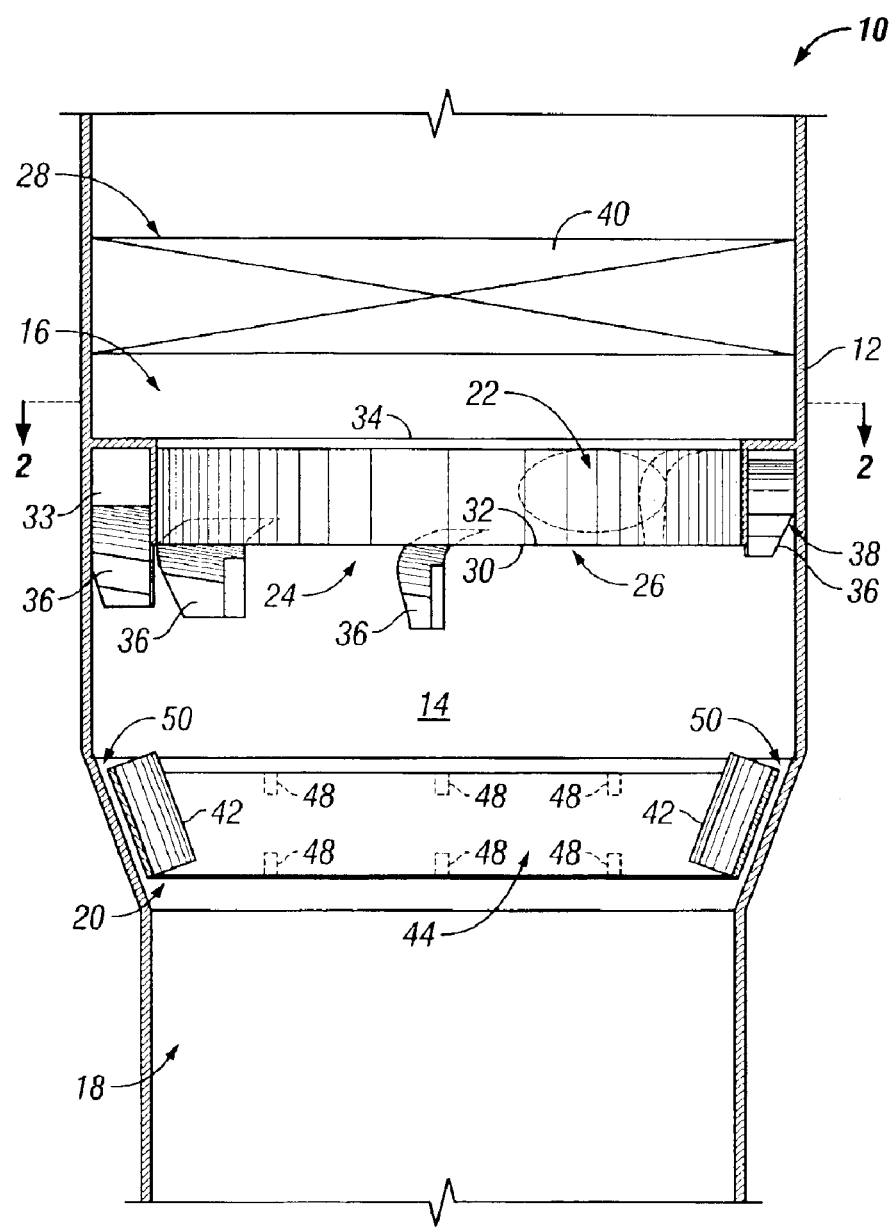
FIG. 3 is a fragmentary side elevation view of the mass transfer column similar to the view shown in FIG. 1 but illustrating a liquid shield in the form of a frusta-conical annular wall positioned in a transition region of the column.

In an alternate embodiment shown in FIG. 3, the column 10 can include a shield 44 positioned in the transition region 20 to shelter liquid flowing downwardly along the inner face of the column shell 12 from the swirling feed stream which can cause unwanted re-entrainment of the liquid. The shield 44 can take many forms and is illustrated as a frusta-conical wall 46 that is concentric with, and spaced inwardly from, the transition region 20 of the column shell 12. Appropriate mounts 48 are used to secure the wall 46 to the shell 12. The spacing between the shell 12 and the wall 46 forms an annulus 50 that provides a passageway for liquid to flow downwardly through the transition region 20 while being shielded from the swirling feed stream. The shield 44 thus reduces the amount of liquid that is entrained by the vapor. Baffles 42 are preferably used in conjunction with the shield 44, and they can be mounted to an inner face of the frusta-conical wall 46.

From the foregoing, it will be seen that this invention is one well adapted to attain all the ends and objectives hereinabove set forth together with other advantages which are inherent to the structure.

It will be understood that certain features and subcombinations are of utility and may be employed without reference to other features and subcombinations. This is contemplated by and is within the scope of the invention.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A mass transfer column comprising:
   an external shell that defines an open internal region within the shell and comprises an upper region of a preselected diameter, a lower region of a reduced diameter, and a transition region positioned between the upper and lower regions and having a diameter that transitions from said preselected diameter to said reduced diameter;
   a vapor or mixed phase feed feed nozzle positioned at least partially within said upper region of the shell for introducing a vapor or mixed phase feed stream within said open internal region of the shell;
   a feed device within said open internal region and positioned to deflect the vapor or mixed phase feed stream when present within said open internal region; and
   at least one baffle positioned in the transition region in vertically spaced relationship to said feed device to deflect at least a portion of said vapor or mixed phase feed stream entering the transition region after the same has been deflected by the feed device.

2. The mass transfer column of claim 1, including a shield spaced inwardly from the shell in the transition region and a liquid flow passage formed in a spacing between said shield and said shell.

3. The mass transfer column of claim 1, wherein said at least one baffle is positioned in the transition region on an inner face of said shell.

4. The mass transfer column of claim 1, wherein said at least one baffle has a planar configuration.

5. The mass transfer column of claim 1, wherein said at least one baffle has a curved configuration.

6. The mass transfer column of claim 1, wherein said feed device includes guide vanes positioned to deflect at least part of said vapor or mixed phase feed stream in a downward direction.

7. A mass transfer column comprising:
   an external shell that defines an open internal region within the shell and comprises an upper region of a preselected diameter, a lower region of a reduced diameter, and a transition region positioned between the upper and lower regions and having a diameter that transitions from said preselected diameter to said reduced diameter;
   a vapor or mixed phase feed feed nozzle positioned at least partially within said upper region of the shell for introducing a vapor or mixed phase feed stream within said open internal region of the shell;
   a feed device within said open internal region and positioned to deflect the vapor or mixed phase feed stream when present within said open internal region; and
   at least one baffle in the open internal region and positioned in the transition region to deflect at least a portion of said vapor or mixed phase feed stream entering the transition region after being deflected by the feed device;
   a shield spaced inwardly from the shell in the transition region; and
   a liquid flow passage formed in a spacing between said shield and said shell.

8. The mass transfer column of claim 2 or 7, wherein said shield comprises an annular wall and said liquid flow passage is an annulus formed between said annular wall and said shell.

9. The mass transfer column of claim 8, wherein said at least one baffle is positioned on an inner face of said annular wall.

10. The mass transfer column of claim 9, wherein said annular wall has a frusta-conical configuration.

11. The mass transfer column of claim 10, wherein said feed device comprises a vapor horn.

12. The mass transfer column of claim 10, including vapor-liquid contacting devices positioned in said upper region.

13. A method of operating a mass transfer column, said method comprising the steps of:
   delivering a vapor or mixed phase feed stream through a feed nozzle into an open internal region within an upper region of an external shell of the column;
   deflecting said vapor or mixed phase feed stream downwardly employing a feed device positioned within said open internal region and causing at least a portion of said vapor or mixed phase feed stream to descend downwardly with a swirling motion into a transition region of the shell having an inwardly sloping surface in a downward direction; and
   deflecting said swirling motion of said vapor or mixed phase feed stream using baffles positioned within said transition region in vertically spaced relationship to said feed device.

14. The method of claim 13, including shielding a liquid stream descending along said inwardly sloping surface in the transition region from said swirling motion of said vapor or mixed phase feed stream.

15. A method of operating a mass transfer column, said method comprising the steps of:
   delivering a vapor or mixed phase feed stream through a feed nozzle into an open internal region within an upper region of an external shell of the column;
   deflecting said vapor or mixed phase feed stream within said open internal region and causing at least a portion of said vapor or mixed phase feed stream to descend downwardly with a swirling motion into a transition region of the shell having an inwardly sloping surface in a downward direction;
   deflecting said swirling motion of said vapor or mixed phase feed stream using baffles positioned within said transition region; and
   shielding a liquid stream descending along said inwardly sloping surface in the transition region from said swirling motion of said vapor or mixed phase feed stream.

16. The method of claim 14 or 15, including providing a shield inwardly of said inwardly sloping surface to form a liquid passage in which said descending liquid stream is shielded from said swirling motion of the vapor or mixed phase feed stream.

* * * * *